(12) United States Patent
Schmitz et al.

(10) Patent No.: US 10,091,835 B2
(45) Date of Patent: Oct. 2, 2018

(54) SYSTEM AND METHOD FOR IMPROVED EMERGENCY MESSAGING

(71) Applicant: SWN Communications, Inc., Secaucus, NJ (US)

(72) Inventors: Anthony Schmitz, Clifton, NJ (US); Alexandros Tsepetis, Wenham, MA (US)

(73) Assignee: SWN COMMUNICATIONS, INC.

( * ) Notice: Subject to any disclaimer, the term of this patent is extended or adjusted under 35 U.S.C. 154(b) by 58 days.

(21) Appl. No.: 15/233,704

(22) Filed: Aug. 10, 2016

(65) Prior Publication Data
US 2017/0048895 A1   Feb. 16, 2017

Related U.S. Application Data

(60) Provisional application No. 62/203,505, filed on Aug. 11, 2015.

(51) Int. Cl.
| | |
|---|---|
| H04L 12/28 | (2006.01) |
| H04W 76/50 | (2018.01) |
| H04L 12/18 | (2006.01) |
| H04L 29/08 | (2006.01) |
| H04L 12/26 | (2006.01) |
| H04W 4/22 | (2009.01) |
| H04W 4/90 | (2018.01) |
| H04L 29/12 | (2006.01) |

(52) U.S. Cl.
CPC ......... H04W 76/50 (2018.02); H04L 12/1886 (2013.01); H04L 43/10 (2013.01); H04L 67/1051 (2013.01); H04W 4/22 (2013.01); H04W 4/90 (2018.02); H04L 61/2514 (2013.01); H04L 61/6068 (2013.01)

(58) Field of Classification Search
USPC .......................................... 370/328, 255, 311
See application file for complete search history.

(56) References Cited

U.S. PATENT DOCUMENTS

| | | | | |
|---|---|---|---|---|
| 2007/0115868 | A1* | 5/2007 | Chen | G08G 1/163 370/315 |
| 2013/0083684 | A1* | 4/2013 | Yeh | H04W 8/26 370/252 |
| 2015/0349917 | A1* | 12/2015 | Skaaksrud | G06Q 10/0833 370/328 |

* cited by examiner

Primary Examiner — Phuongchau BA Nguyen
(74) Attorney, Agent, or Firm — Jennifer Meredith, Esq.; Meredith & Keyhani, PLLC

(57) ABSTRACT

A method to manage operations between a backend server and a set of devices, each device comprising a customer account number and a Wi-Fi Broadcast System (WFBS), the WFBS iteratively performing the following steps at a predefined time interval: (1) generating at a given WFBS a customer identification number for each customer account (2) broadcasting the customer identification number to each WFBS on the subnet of the given WFBS (3) receiving the customer identification number from each WFBS on the subnet of the given WFBS (4) processing the received customer identification number at the given WFBS, and (5) designating the given WFBS as a master WFBS for a given time integral if the given WFBS satisfies a predetermined criterion before performing a set of master operations.

21 Claims, 8 Drawing Sheets

| Account | Public IP | # of WFBS on subnet |
|---|---|---|
| XYZ | 192.9.201.14 | 17 |
| XYZ | 192.9.202.17 | 96 |
| XYZ | 192.9.203.24 | 197 |

FIGURE 6

| Account | Public IP | Private Network | # of WFBS on subnet |
|---|---|---|---|
| XYZ | 192.9.201.14 | 10.100.x.x | 17 |
| XYZ | 192.9.202.17 | 10.101.x.x | 96 |
| XYZ | 192.9.203.24 | 10.102.x.x | 197 |

FIGURE 7

SYSTEM AND METHOD FOR IMPROVED EMERGENCY MESSAGING

1. FIELD OF DISCLOSURE

The claimed system and method improve the ability to deliver emergency alert messages to a group of users. The method manages communications between a backend server and a set of devices to execute operations which improve the efficiency of alert message delivery to a group of users. This application incorporates by reference provisional patent application No. 62/203,505 filed Aug. 11, 2015 and entitled, "Wi-Fi Broadcast System Messaging."

2. BRIEF DESCRIPTION OF RELATED ART

The modern world is marked by emergency communication capabilities that enable people to connect with others across the globe via telephonic networks, cellular networks, and internet based voiceover IP technologies. However, in spite of features made available through modern technology, unsatisfied needs remain. For example, sending individual emergency alerts to large number subscribers may not be cost effective. A large number of alerts may cause system bottlenecks which may lead to some alert messages being lost or delivered after critical time window. A need exists for a time, money, and cost effective means for guaranteed delivery of emergency alert messages.

3. SUMMARY OF THE INVENTION

A method for non-transitory computer readable medium containing computer instructions configured to operate with electronic computer hardware to manage operations between a backend server and a set of devices, each device comprising a customer account number and a Wi-Fi Broadcast System (WFBS), the WFBS iteratively performing the following steps at a predefined time interval: (1) generating at a given WFBS a customer identification number for each customer account (2) broadcasting the customer identification number to each WFBS on the subnet of the given WFBS, wherein the customer identification number is broadcasted to a designated WFBS port on the subnet of the given WFBS (3) receiving the customer identification number from each WFBS on the subnet of the given WFBS (4) processing the received customer identification number at the given WFBS, and (5) designating the given WFBS as a master WFBS for a given time integral if the given WFBS satisfies a predetermined criterion before performing a set of master operations.

4. BRIEF DESCRIPTION OF THE DRAWINGS

FIG. 6 shows an example of broadcast from the master to the backend server when map private network option is not selected;

Figure 8:
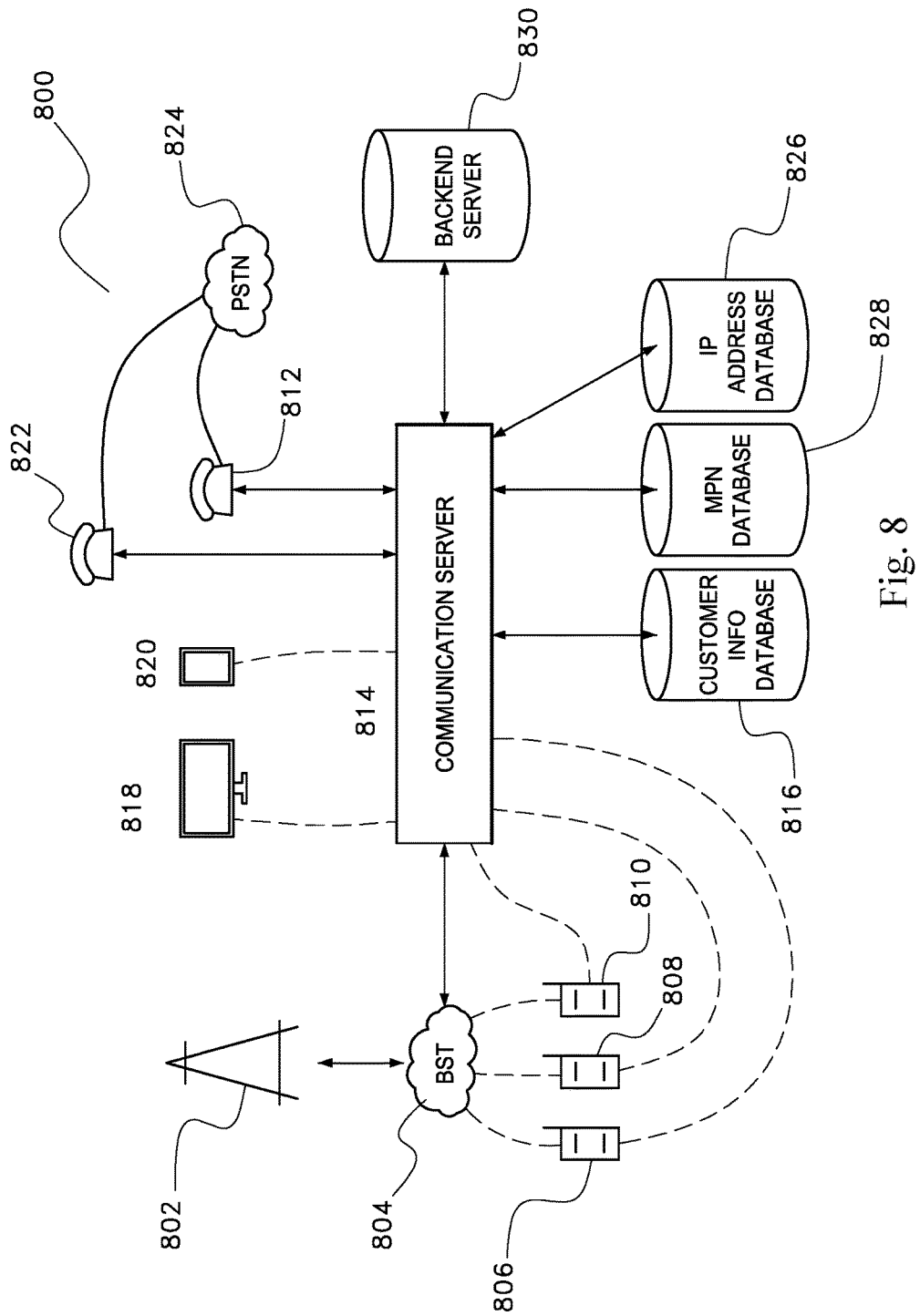
Figure 9:
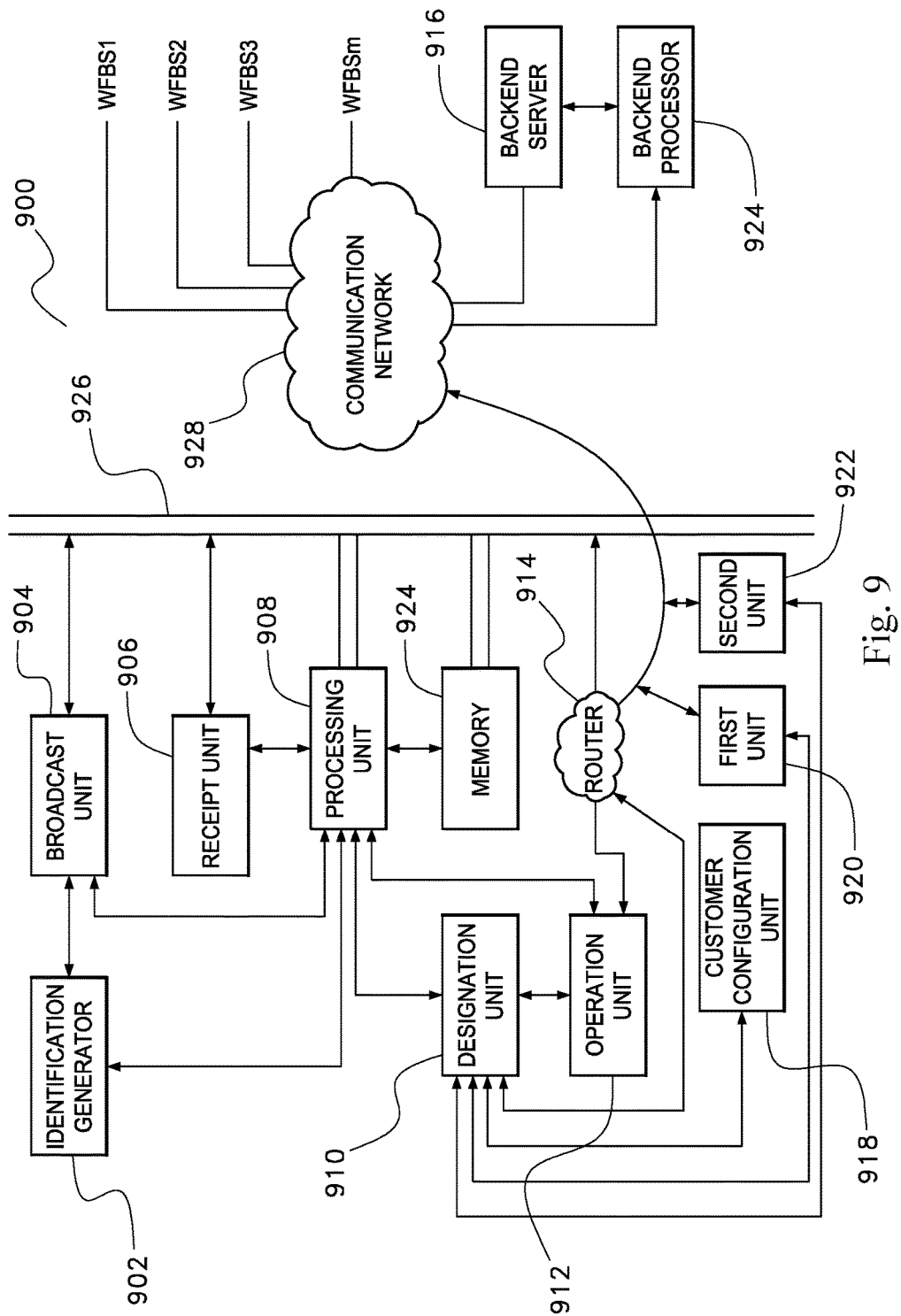

FIG. 7 indicates an example of broadcast from the master to the backend server when map private network option is selected;

FIG. 8 illustrates an integrated communications network 800 according to the preferred embodiment of the disclosed invention; and FIG. 9 a block diagram showing an embodiment of a communication system that can implement any of the embodiments of the disclosed system that are described herein.

5. DETAILED DESCRIPTION OF THE INVENTION

A method for non-transitory computer readable medium containing computer instructions configured to operate with electronic computer hardware to manage operations between a backend server and a set of devices, each device comprising a customer account number and a Wi-Fi Broadcast System (WFBS), the WFBS iteratively performing the following steps at a predefined time interval: (1) generating at a given WFBS a customer identification number for each customer account (2) broadcasting the customer identification number to each WFBS on the subnet of the given WFBS, wherein the customer identification number is broadcasted to a designated WFBS port on the subnet of the given WFBS (3) receiving the customer identification number from each WFBS on the subnet of the given WFBS (4) processing the received customer identification number at the given WFBS, and (5) designating the given WFBS as a master WFBS for a given time integral if the given WFBS satisfies a predetermined criterion before performing a set of master operations.

A method for non-transitory computer readable medium containing computer instructions configured to operate with electronic computer hardware to manage operations between a backend server and a set of devices is disclosed. In the claimed method, each device comprises a customer account number and a Wi-Fi Broadcast System (WFBS). In a preferred embodiment of the disclosed invention, the WFBS code may be supported on several device types. The disclosed invention may be used on various mobile devices, for example, the disclosed invention may be embedded on Google's Android® and Apple's iOS® operating systems used primarily in mobile technologies.

Figure 1:
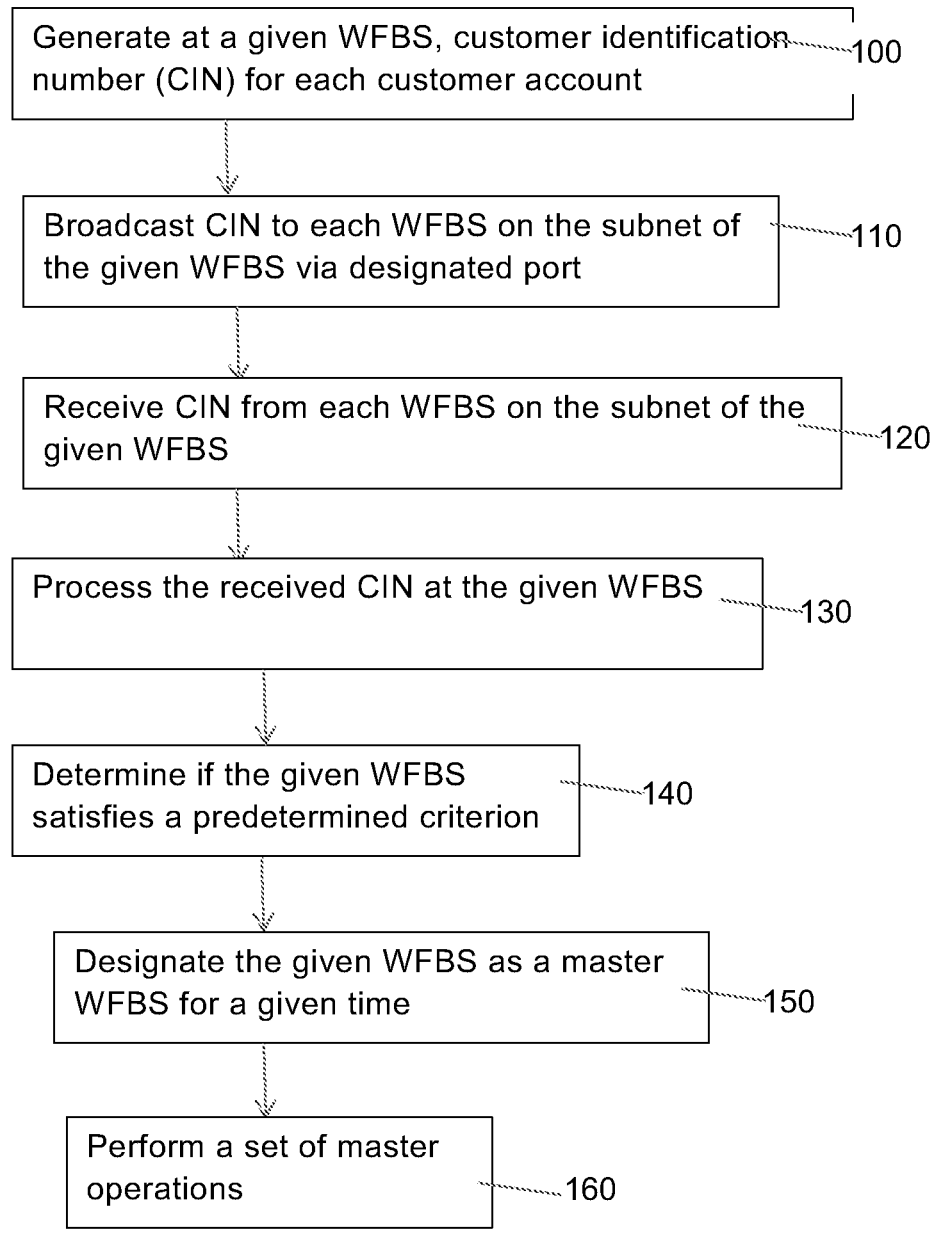
FIG. 1 represents a flow chart showing a list of steps performed by the disclosed method.

Referring now to FIG. 1, representing a flow chart showing a list of steps performed by the disclosed method. At block 100 the disclosed method may generate at a given WFBS, a customer identification number (CIN) for each customer account. The manner in which the CIN is generated is further described in detail in conjunction with FIG. 3. At block 110, the disclosed method may broadcast the customer identification number generated in step 100 to each WFBS on the subnet of the given WFBS.

In the preferred embodiment of the disclosed invention, the customer identification number is broadcasted to a designated WFBS port on the subnet of the given WFBS. At block 120 the disclosed method may receive the customer identification number from each WFBS on the subnet of the given WFBS. At block 130 the disclosed method may process the received customer identification number at the given WFBS. This process is further described in conjunction with FIG. 2. At block 140 the disclosed method may determine if the given WFBS satisfies a predetermined criterion.

In the preferred embodiment of the disclosed invention, the predetermined criterion may be that the WFBS with the integer closest to zero is designated as the master for its subnet/account for the given time integral or at that moment in time. Furthermore, up to three masters may broadcast their availability to work as a master to the backend server. The set of operations performed by the master are referred to as a set of master operations. In the preferred embodiment of the disclosed invention, the predetermined criterion is WFBS with the integer closest to zero is designated as the master for its subnet/account at that moment in time and wherein up to three masters broadcast their availability to work as a master to the backend server.

If the disclosed method at block 150 determines that the given WFBS satisfies a predetermined criterion, then the given WFBS may be designated as master at block 150. Thus, after being designated as master, the designated WFBS may start performing a set of master operations at block 160. Accordingly, the disclosed method designates the given WFBS as a master WFBS for a given time integral if the given WFBS satisfies a predetermined criterion before performing a set of master operations. The set of master operations is further described in conjunction with FIG. 4.

Each peer WFBS may receive the broadcast sent by the given WFBS. The lowest three WFBS, that is the WFBS with the integer closest to zero) are considered the masters for its subnet/account at that moment in time. Thus, at any given time, up to three masters may broadcast their availability to work as a master to the backend server. Thus, the assumption is that up to three masters will broadcast their availability as a master to the SWN backend.

Figure 2:
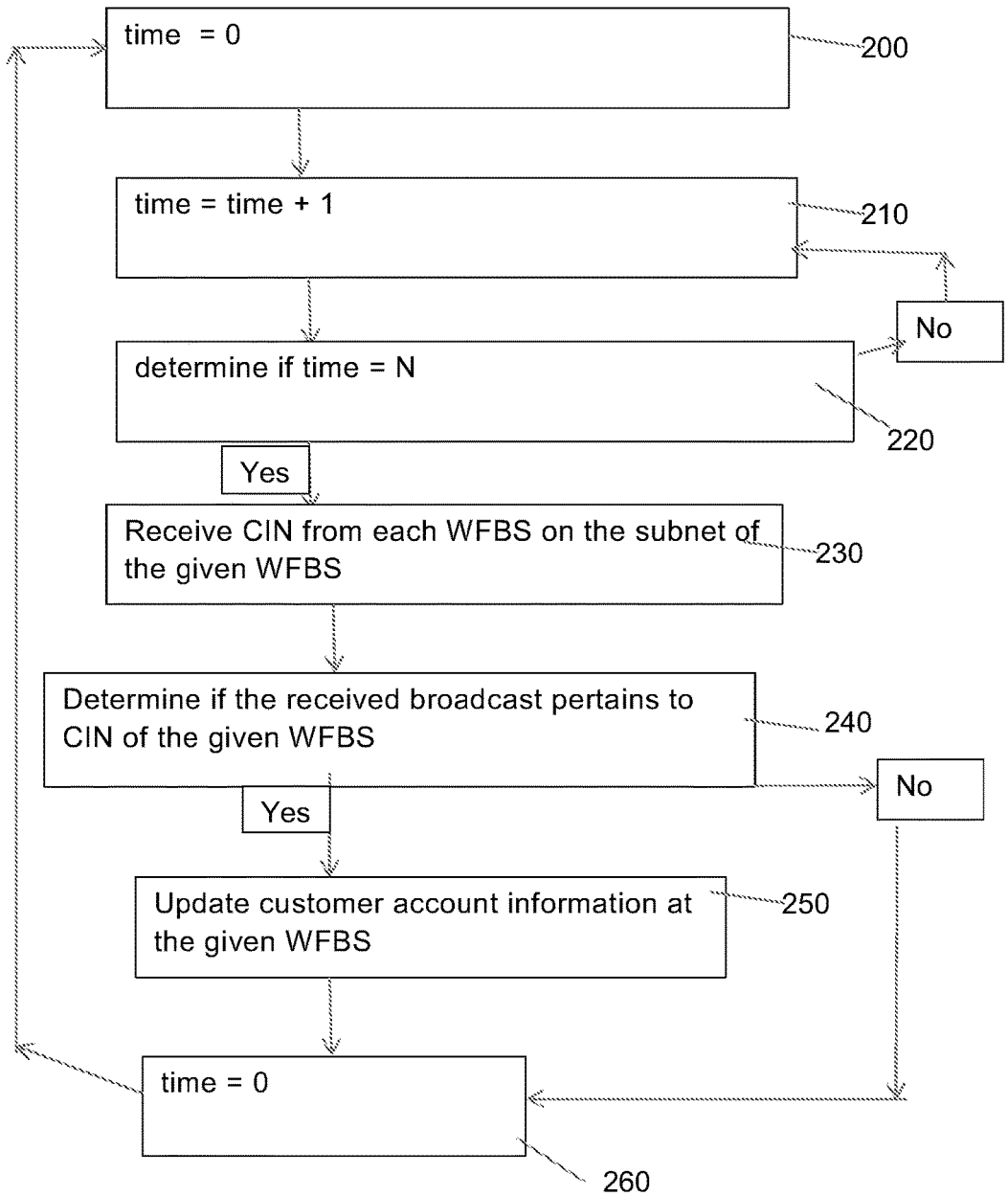
FIG. 2 illustrates the steps taken by the given WFBS to process the customer identification number received from peer WFBS.

FIG. 2 illustrates the steps taken by the given WFBS to process the customer identification number received from peer WFBS. At block 200 the process may initialize the time variable to zero. As described above, every N seconds each WFBS may conduct a broadcast on its subnet via the defined WFBS port. In the preferred embodiment of the disclosed invention, the disclosed method may determine which port the given WFBS may use for broadcast.

In the preferred embodiment of the disclosed invention, each WFBS may broadcast the customer identification number to the designated WFBS port on the subnet of the given WFBS every 30 seconds. Additionally, any other time integral such as 20 seconds, 40 seconds or 50 seconds and the like may be configured as the broadcast time integral by the disclosed method.

At bock 210 the disclosed method may increment the time variable by one, and determine if the value of the given time variable is equal to the defined time integral value at block 220. This is done to ensure that a broadcast is received every N time integrals, thus the disclosed method may increment the time variable by one, and determine if the value of the given time variable is equal to the defined time integral value at block 220.

The method may return to bock 210 to increment the time variable by one if the value of the given time variable is not equal to the defined time integral value. This process may continue until the value of the given time variable is equal to the defined time integral value. When the method determines that the value of the given time variable is equal to the defined time integral value at block 220, the method may proceed to block 230, where the method may receive CIN from each WFBS on the subnet of the given WFBS.

As described above in conjunction with block 130 in FIG. 1, the method may process the received customer identification number at the given WFBS. This processing further comprises the given WFBS selectively keeping track of broadcasts for customer account associated with the given WFBS. Thus, at block 230, the method may determine if the received broadcast pertains to CIN of the given WFBS.

If the received broadcast pertains to CIN of the given WFBS, then the method may proceed to block 250 to update customer account information at the given WFBS, otherwise the method may process to block 260 to set the value of the time variable to zero. From block 260 the process may return to block 200. This way, for each N seconds the method may receive CIN and update the customer account information at the given WFBS if the received broadcast pertains to the CIN of the given WFBS.

Figure 3:
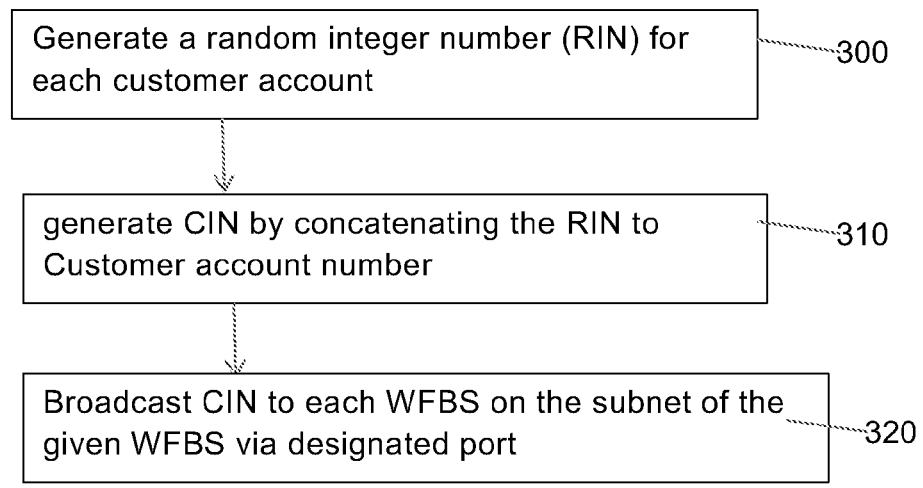
FIG. 3 depicts a block diagram of the manner in which the customer identification number is generated and broadcasted to the peer WFBS.

FIG. 3 depicts a block diagram of the manner in which the customer identification number is generated and broadcasted to the peer WFBS. In the preferred embodiment of the disclosed invention, the customer identification number for each customer account is generated by combining a random number and a customer account number. In this embodiment, the broadcast may include a random number generated (RNG) on the broadcasting device and the customer account identifier.

At block 300, the given WFBS may generate a random integer number (RIN) for each customer account. At block 310, the given WFBS may generate a CIN by concatenating the RIN generated in block 300 to customer account number. At block 320, the given WFBS may broadcast the CIN generated at block 310 to each WFBS on the subnet of the given WFBS via a designated port.

Notably, the disclosed method may use an approach for generating a random number generation that will work for both Apple® and Android® devices. The disclosed approach will ensure that the number generation mechanism is portable and will reasonably guarantee that the generated numbers will be random, unique and can easily be compared over the period of time.

Each device with a WFBS may broadcast a CIN to each peer WFBS on the subnet. Following is an example of a CIN which is a combination of the random number plus the customer account number:

4545445454544343 XYZ-ACCOUNT

In this example, 4545445454544343 is the random number generated at a given WFBS and XYZ is the account number. As described above, the disclosed method is for managing operations between a backend server and a set of devices, each device comprising a customer account number and a Wi-Fi Broadcast System. Notably, one customer account number may have several devices and thus several WFBS associated with the customer account.

For example, a university may have one customer account, with account number 12345. The customer account number 12345 may have several devices that belong to several departments of the university such as department of arts, business, engineering, science and mathematics, law and the like. Each device associated with the account number 12345 may have a WFBS associated with it. As described above, each WFBS associated with the each device associated with the customer account number 12345 may keep track of broadcasts for the customer account that is associated with the WFBS—in the above example, the 12345 ACCOUNT. In other words, in the preferred embodiment of the disclosed invention, the given WFBS may selectively keep track of broadcasts for customer account associated with the given WFBS.

Alternatively, the customer identification number for each customer account may be generated by concatenating a random number, customer initials, and a customer account number. In yet another embodiment of the disclosed invention, the customer identification number for each customer account may be generated by concatenating a random number, customer zip code, and a customer account number.

In the preferred embodiment of the disclosed method, even though the given WFBS may receive CIN broadcasts from each WFBS on the subnet of the given WFBS, each received CIN broadcast may not be pertinent to the given WFBS. Notably, each WFBS may selectively keep track of broadcasts for customer account associated with the given WFBS. Thus, processing the received customer identification number at the given WFBS may further comprise the given WFBS selectively keeping track of broadcasts for customer account associated with the given WFBS. In other words, the step of processing the received customer identification number at the given WFBS further comprises the given WFBS selectively keeping track of broadcasts for customer account associated with the given WFBS.

In an alternate embodiment of the disclosed invention, while each WFBS may selectively keep track of each received pertinent broadcast, an additional fault tolerant server may be used to keep track of each broadcast received at each WFBS and to verify that each WFBS has accurately kept track of each received pertinent broadcast.

Figure 4:
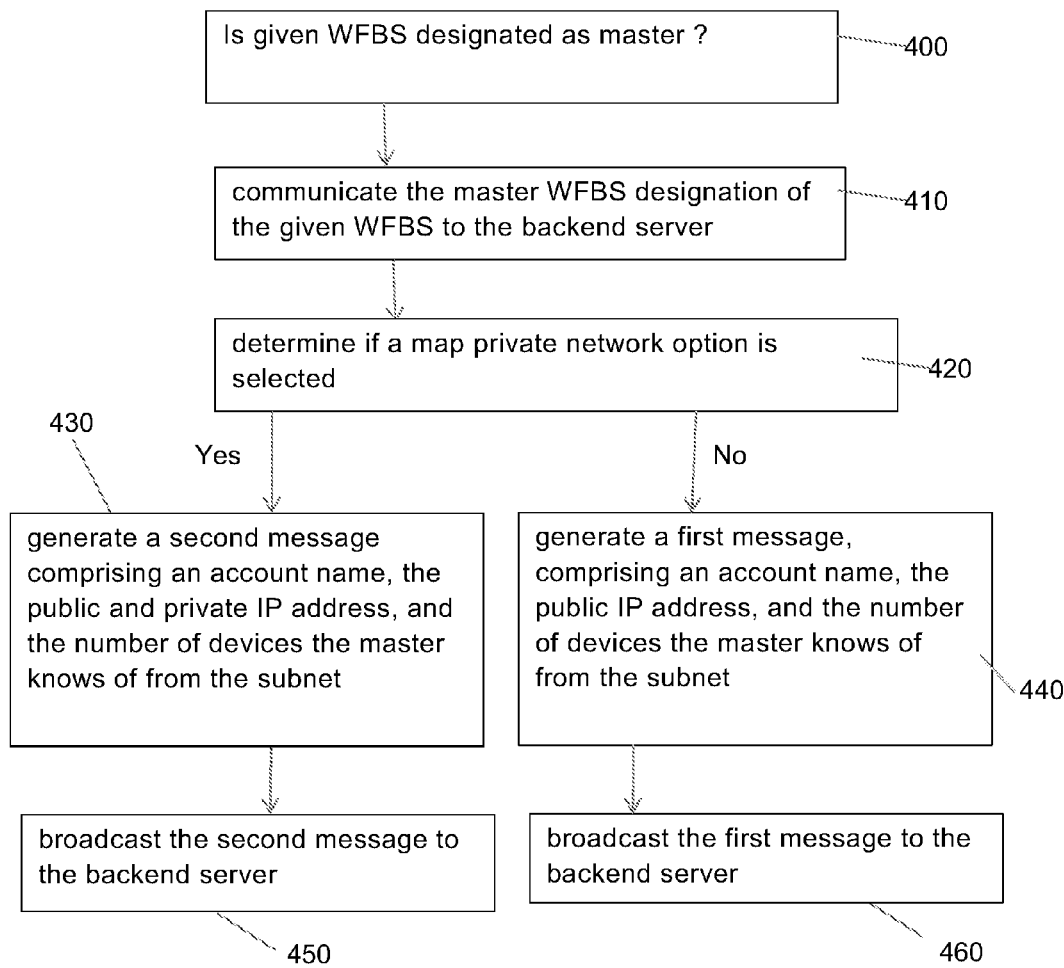
FIG. 4 shows a flow chart illustrating the communication between a master and a backend server.

A flow chart illustrating the communication between a master and a backend server is shown in FIG. 4. At block 400 the given WFBS may determine whether the given WFBS designated as master. If the given WFBS designated as master, then the method may proceed to block 410 to communicate the master WFBS designation of the given WFBS to the backend server. The given WFBS may at block 420 determine if a map private network option is selected.

If the method determines that a map private network option is selected, then at block 430, the method may generate a second message, the second message comprising an account name, the public IP address, the private IP address and the number of devices the master knows of from the subnet. The method may broadcast the generated second message to the backend server at block 450.

Alternatively, if at block 420 the given WFBS determines that a map private network option is not selected. Then at block 440, the method may generate a first message to the backend server, the first message comprising an account name, the public IP address, and the number of devices the master knows of from the subnet. The method may broadcast the generated first message to the backend server at block 460.

In the preferred embodiment of the disclosed invention the map private network option is selected by an authorized administrator via an administrative interface. By selecting map private network option on the administrative interface, the administrator may selectively send alert messages to certain subnets.

Figure 5:
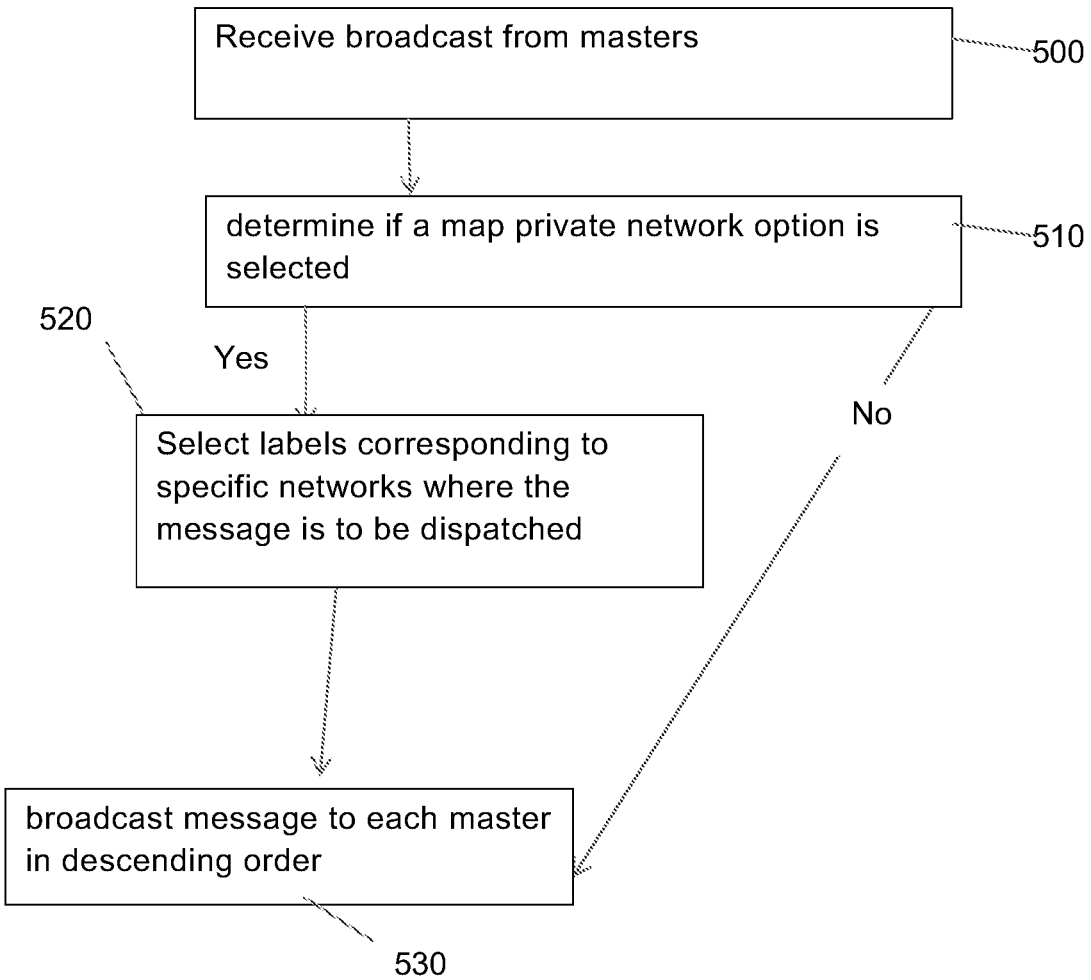
FIG. 5 illustrates manner in which backend server may process broadcast received from masters at given time integral.

FIG. 5 illustrates manner in which backend server may process broadcast received from masters at given time integral. At block 500 a backend server may receive a broadcast from masters. The content of the broadcast message may depend upon option selected by the customer. Each message passed to the backend from a master may include an account name, the number of devices the master knows of from the subnet given that each WFBS has made itself visible. In the preferred embodiment of the disclosed invention, the customer may select to turn on a private network option, which may be displayed on the administrative interface for customer's authorized administrators. This option may be a radio button, or a toggle switch displayed on the administrative interface for the customer.

Additionally, the administrators may be able to label private networks that the method has discovered if they choose to only send messages to certain subnets and not the entire set of subnets that the method has captured information on. The option of labeling subnets may only be visible with the map private network option is selected. The map private network on/off setting will be passed to WFBS devices via heartbeat messaging. If an alert sender then sends an alert they can they select subnets they wish to send a message to from a drop down list of all of the labels associated with the discovered WFBS. It would be appreciated that the method may not have to MAP the private network space of customer unless the customer has selected to turn on the map private network option.

The method may determine at block 510 if the map private option is selected by the customer. In the event that the customer has selected the map private network option then the method may proceed to block 520, at this junction, the administrator may select labels corresponding to specific networks where the message is to be dispatched to. This phenomenon is described in conjunction with FIGS. 6 and 7.

Alternatively, if the customer did not select the map private network option then the method may proceed to block 530 to broadcast message to each master in the descending order. The descending order aspect of the disclosed invention is described in conjunction with FIG. 7. Notably, regardless of whether the map private network option is selected or not, the list of masters may be continually changing and dynamic. In the preferred embodiment of the disclosed invention the list of masters may change frequently as devices, hence the WFBS move to/from various subnets overtime.

The IP address received on the backend server may be a public IP associated with the network address translationed (Nat'ed) private address for that specific WFSB master. The relationship between a WFBS and backend server will be maintained using the public IP of the WFBS. This mapping between a WFBS and backend server may be dynamic, continuous, and ongoing. At any point in time a list of N number of IP addresses may be available on the backend server for an account xyz corresponding to each subnet for which a master is currently present. The list may be very dynamic and masters may expire every N seconds.

FIG. 6 shows table 600 showing an example of broadcast from the master to the backend server when map private network option is not selected. Column 610 may indicate customer account number. The public IP address may be indicated in column 620 and the number of WFBS on subnet may be shown in column 630. As seen in table 600, 17 WFBS are visible on public IP address 192.9.201.14 for account XYZ. Likewise, 96 WFBS are visible on public IP address 192.9.202.17 for account XYZ. Similarly, 197 WFBS are visible on public IP address 192.9.203.24 for account XYZ. Notably, the aggregate number of subnets and WFBS may be displayed on the various send alert pages. For example, the following statistics may be displayed on the customer account information: Sub-nets discovered: 211, Devices: 47,519, Average Devices/Sub-net: 225.

FIG. 7 indicates a table 700 showing an example of broadcast from the master to the backend server when map private network option is selected. Column 710 may indicate customer account number. The public IP address may be indicated in column 720 and the private network IP address may be displayed in column 730. The number of WFBS on subnet may be shown in column 740. As seen in table 700, 17 WFBS are visible on public IP address 192.9.201.14, private IP 10.100.x.x, and for account XYZ. Likewise, 96 WFBS are visible on public IP address 192.9.202.17, private IP 10.101.x.x for account XYZ.

Similarly, 197 WFBS are visible on public IP address 192.9.203.24, private IP 10.102.x.x., for account XYZ. This information may be stored on the backend server. Advantageously, the administrator of the customer may be able to map private IP address to a specific entity. For example, the private IP address 10.100.x.x maybe mapped to the college of engineering, 10.101.x.x. maybe be mapped to the college of arts, 10.102.x.x maybe mapped to the college of law and the like. The disclosed method may display a drop down list displaying the mapping between the private IP address and the name of facility on the administrator interface. The administrator may select a specific site or a group of specific sites from the drop down list and selectively send an alert to the selected specific sites if the map private network option is selected by the customer.

The backend server of the disclosed method may dispatch alert to each master in descending order. Thus, for example, the backend server may send alert to address 192.9.203.24 first since there are has 197 WFBS or devices located on that address. Then the backend server may send alerts to 192.9.202.17 since the address has 96 WFBS or devices. Lastly, the backend server may send alerts to 192.9.201.14 since the address has 17 WFBS or devices. In other words, the prioritization of alerts m sent by the backend may be determined by the number of WFBS associated to a given Public IP address. Those Public IPs addresses with the highest counts of WFPBS could be delivered first. Thus, the backend server may accept a selection of labels indicating specific networks where the message is to be dispatched, if the map private option is selected by the customer. Further, the backend server may prioritize the order in which the message is to be delivered based upon the number of WFBS per IP Address before broadcasting message to the selected network.

Notably, each Master may receive the message via the master's public IP address. Upon receiving the message, the master may immediately re-broadcast the alert to all other WFBS on its subnet using a unique identifier for making sure the alert is only displayed once. This allows for the case where each subnet can have up to three Masters yet the disclosed method may only deliver one alert. The alert may be an express voice mail or an express messenger alert. This feature of the disclosed invention may ensure that suppression is in place.

Even though messages may be transmitted anonymously via broadcast on the subnet to eligible WFBS—when they are received by the disclosed method has a way to know that the messages were received and who the messages were received by. This is accomplished via an alert tracer feature which can display what time the alert message was received and the identity of the alert message recipient.

FIG. 8 illustrates an integrated communications network 800 according to the preferred embodiment of the disclosed invention. The network includes a base station 802 coupled to a mobile switching center (MSC) 804, mobile terminals 806, 808, and 810. The network 800 also includes a communication server 814, personal computer 818, a computing device 820 such as an iPad®, a landline telephones 812 and 822, and PSTN 824. In the example communications network 814, some of the aforementioned communication devices may have the disclosed system application installed, which may enable the devices to exchange voice and data with other computing devices in real-time.

Additionally, FIG. 8 illustrates several databases such as a customer information database 816, a MPN database 828, and an IP address database 826 in communication link with the communications network 814. Many other databases may be included in the disclosed system to facilitate communication as disclosed herein.

While sending alerts, the masters at the given time integral of the disclosed system may use a customer information database 816, a MPN database 828, IP address database 826 to offer services, such as, to send messages via the email, text, or instant messaging to the WFBS in its subnet. The Network 814 may be configured to execute server side instructions for the disclosed method.

On the other hand, computing devices such as the personal computer 818, the tablet 820, and the cellular telephones 806, 808, and 810 may be configured to execute the client side instructions for the disclosed method. The client side computing devices may comprise non-transitory computer readable medium containing computer instructions configured to operate with electronic computer hardware to manage operations between a backend server 830 and a set of devices, like cellular telephones 806, 808, and 810. Notably, each of these devices may comprise a customer account number and an embedded Wi-Fi broadcast system of the disclosed invention.

Now turning to FIG. 9 depicting a block diagram showing an embodiment of a communication system 900 that can implement any of the embodiments of the disclosed system that are described herein. The computer system 900 may include a processing unit 908 (CPU), a system memory 924, and a system bus 926 that couples the processing unit 908 to the various components of the computer system 900. A communication server 928 may be used to connect the computer system 900 with m number of devices hosting M number of WFBS, and with the backend server 916. The processing unit 908 may typically include one or more processors, each of which may be in the form of any one of various commercially available processors. A user input output unit not shown in FIG. 9, may work in conjunction with the computer system 900 to accept input from and to display output to the administrator.

The system memory 924 may typically include a read only memory (ROM) that stores a basic input/output system (BIOS) that contains start-up routines for the computer system 900 and a random access memory (RAM). The system bus 926 may be a memory bus, a peripheral bus or a local bus, and may be compatible with any of a variety of bus protocols. The computer system 900 also may include a storage memory, not shown in FIG. 9 (e.g., a hard drive, a floppy drive, a CD ROM drive, magnetic tape drives, flash memory devices, and digital video disks) that is connected to the system bus 926 and contains one or more computer-readable media disks that provide non-volatile or persistent storage for data, data structures and computer-executable instructions.

An identification generator 902 may be used to generate at a given WFBS, a customer identification number for each customer account. A broadcast unit 904 may be coupled to the identification generator 902 for broadcasting the customer identification number to each WFBS on the subnet of the given WFBS, wherein the customer identification number may be broadcasted to a designated WFBS port on the subnet of the given WFBS.

In the preferred embodiment of the disclosed invention, the broadcast unit 904 may be configured to broadcast every 30 seconds, the customer identification number to the designated WFBS port on the subnet of the given WFBS. A receiving unit 906 may be used for receiving the customer identification number from each WFBS on the subnet of the given WFBS. As described above, the customer identification information may be transmitted every N time integrals. A processing unit 908 coupled to the receiving unit may be employed for processing the received customer identification number at the given WFBS.

A receipt unit 906 may be coupled to a designation unit 910 for receiving broadcast from each WFBS on the subnet of the given WFBS. The disclosed system may use the designation unit 910 coupled to the processing unit 908 for designating the given WFBS as a master WFBS for a given time integral if the given WFBS satisfies a predetermined criterion. Likewise, an operation unit 912 may be used for performing a set of master operations. The designation unit may be coupled with a router 914 for communicating the master WFBS designation of the given WFBS to the backend server.

The router 914 may be coupled to a customer configuration unit 918. The customer configuration unit 918 may be used for determining if a map private network option is selected. Likewise, a first unit 920 may be coupled to the router for broadcasting a first message to the backend server if the map private network option is not selected, the first message comprising an account name, the public internet protocol (IP) address, and the number of devices the master knows of from the subnet.

Alternatively a second unit 922 may be coupled to the router broadcasting a second message to the backend server if a map private network option is selected, the second message comprising an account name, the public IP address, the private IP address and the number of devices the master knows of from the subnet. Notably, the map private network option may be selected by an authorized administrator via an administrative interface. Using the map private network option, the administrators can selectively send alert messages to certain subnets after selecting map private network option. In the preferred embodiment of the disclosed invention, each WFBS may communicate the selection of map private network option to other WFBS devices via heartbeat messaging.

A backend processor 924 may be coupled to the backend server 916, the backend processor 924 may be configured to receive the broadcast at the backend server 916 from at least one master and to determine if the map private option is selected by the customer. Furthermore, the backend processor 924 may be configured prompt the customer/administrator to select labels corresponding to specific networks where the message is to be dispatched before broadcasting message to the selected network if the map private option is selected by the customer. Likewise, the backend processor 924 may be configured to broadcast message to each master in the descending order if the customer did not select the map private network option.

Using the disclosed system and method a customer may have to send fewer alert messages. The resultant savings can be financially advantageous to the customer. Furthermore, sending fewer alerts may be efficient in the emergency situations. In the example described in FIG. 6, the following statistics may be displayed on the customer account information: Sub-nets discovered: 211, Devices: 47,519, Average Devices/Sub-net: 225. This means that 47,519 subscriber devices are present in the 211 subnets at that specific time.

Typically, time is of essence in the emergency situations. Thus, instead of sending—in this example—47,519 separate Express Voice/Express Messenger messages—the disclosed system can instead send 211 Express Voice/Express Messenger messages to 211 master re-broadcasters without suffering any diminishment in reporting or tracking capabilities. For example, while issuing an earthquake warning to the residents of a high rise building, it would be extremely beneficial to send fewer alerts and to verify which residents have received the issued alerts and are taking steps to evacuate the building premises.

Likewise, resources are of essence in the emergency situations. Sending 211 alert messages for example, may save valuable network resources which may otherwise be needed to communicate with the 47,519 customers. Further, having an acknowledgement that the recipient has received the alert message may be extremely helpful in the emergency situations. Because time is of essence in the emergency situations, knowing the precise time when the alert was received by the recipient can similarly be very helpful in taking measures to resolve the emergency situations.

In other words, the disclosed system may be able to identify when an alert was received and by whom the alert was received. This feature may be very crucial in the emergency situations. But the disclosed system can send these 47,519 recipients a message and have it be received by the target recipient in 10 seconds or less. In one embodiment of the disclosed invention, the disclosed invention may be anonymously download the disclosed application via QR codes for example and receive emergency alerts from the disclosed application. Each anonymously downloaded application may be assigned a stub user ID when the app is downloaded—such as app_user_nyu_1234. This feature may allow alerts sent by the disclosed system to be the fastest, most cost effective way of sending notifications to the interested parties—like residents of the building, employees of a company, travelers on a cruise, visitors to a hospital and the like.

What is claimed is:

1. A method for non-transitory computer readable medium containing computer instructions configured to operate with electronic computer hardware to manage operations between a backend server and a set of devices, each device comprising a customer account number and a Wi-Fi Broadcast System (WFBS), the WFBS iteratively performing the following steps at a predefined time interval:
   generating at a given WFBS, a customer identification number for each customer account;
   broadcasting the customer identification number to each WFBS on the subnet of the given WFBS, wherein the customer identification number is broadcasted to a designated WFBS port on the subnet of the given WFBS;
   receiving the customer identification number from each WFBS on the subnet of the given WFBS;
   processing the received customer identification number at the given WFBS; and
   designating the given WFBS as a master WFBS for a given time integral if the given WFBS satisfies a predetermined criterion before performing a set of master operations.

2. The method of claim 1, wherein the set of master operations comprise:
   communicating the master WFBS designation of the given WFBS to the backend server;
   determining if a map private network option is selected;

broadcasting a first message to the backend server if the map private network option is not selected, the first message comprising an account name, the public internet protocol (IP) address, and the number of devices the master knows of from the subnet; and broadcasting a second message to the backend server if a map private network option is selected, the second message comprising an account name, the public IP address, the private IP address and the number of devices the master knows of from the subnet.

3. The method of claim 2, wherein the map private network option is selected by an authorized administrator via an administrative interface.

4. The method of claim 3, wherein the administrators can selectively send alert messages to certain subnets after selecting the map private network option.

5. The method of claim 4, wherein each WFBS communicates the selection of map private network option to other WFBS devices via heartbeat messaging.

6. The method of claim 1, further comprises the step of broadcasting every 30 seconds, the customer identification number to the designated WFBS port on the subnet of the given WFBS.

7. The method of claim 1, wherein the customer identification number for each customer account is generated by combining a random number and a customer account number.

8. The method of claim 1, further comprises the step of generating the customer identification number for each customer account by concatenating a random number and a customer account number.

9. The method of claim 1, wherein the predetermined criterion is WFBS with an integer closest to zero is designated as the masters for its subnet/account at that moment in time and wherein up to three masters broadcast their availability to work as a master to the backend server.

10. The method of claim 1, wherein the step of processing the received customer identification number at the given WFBS further comprises the given WFBS selectively keeping track of broadcasts for customer account associated with the given WFBS.

11. The method of claim 1, further comprising the steps of:
receiving the broadcast at the backend server from at least one master;
determining if a map private option is selected by the customer;
accepting a selection of labels indicating specific networks where the message is to be dispatched, if the map private option is selected by the customer, and prioritizing the order in which the message is to be delivered based upon the number of WFBS per IP Address before broadcasting message to the selected network; and
broadcasting message to each master in the descending order if the customer did not select the map private network option.

12. The method of claim 11, further comprising the steps of: determining the priority in which alerts may be sent by the backend server to the IP address based on the number of WFBS on the subnet, wherein IP address with highest number of WFBS on subnet may get a highest priority.

13. A system for non-transitory computer readable medium containing computer instructions configured to operate with electronic computer hardware to manage operations between a backend server and a set of devices, each device comprising a customer account number and a Wi-Fi Broadcast System (WFBS), the system comprising:

an identification generator to generate at a given WFBS, a customer identification number for each customer account;

a broadcast unit coupled to the identification generator for broadcasting the customer identification number to each WFBS on the subnet of the given WFBS, wherein the customer identification number is broadcasted to a designated WFBS port on the subnet of the given WFBS;

a receiving unit for receiving the customer identification number from each WFBS on the subnet of the given WFBS;

a processing unit coupled to the receiving unit for processing the received customer identification number at the given WFBS;

a designation unit coupled to the processing unit for designating the given WFBS as a master WFBS for a given time integral if the given WFBS satisfies a predetermined criterion; and an operation unit coupled to the processing unit for performing a set of master operations.

14. The system of claim 13, wherein the designation unit further comprises:
a router for communicating the master WFBS designation of the given WFBS to the backend server;
a customer configuration unit for determining if a map private network option is selected;
a first unit coupled to the router for broadcasting a first message to the backend server if the map private network option is not selected, the first message comprising an account name, the public internet protocol (IP) address, and the number of devices the master knows of from the subnet; and
a second unit coupled to the router broadcasting a second message to the backend server if a map private network option is selected, the second message comprising an account name, the public IP address, the private IP address and the number of devices the master knows of from the subnet.

15. The system of claim 14, wherein the map private network option is selected by an authorized administrator via an administrative interface.

16. The system of claim 15, wherein the administrators can selectively send alert messages to certain subnets after selecting map private network option.

17. The system of claim 15, wherein each WFBS communicates the selection of map private network option to other WFBS devices via heartbeat messaging.

18. The system of claim 13, wherein the broadcast unit is configured to broadcast every 30 seconds, the customer identification number to the designated WFBS port on the subnet of the given WFBS.

19. The system of claim 13, wherein the predetermined criterion is WFBS with an integer closest to zero is designated as the masters for its subnet/account at that moment in time and wherein up to three masters broadcast their availability to work as a master to the backend server.

20. The system of claim 13, further comprising the given WFBS selectively keeping track of broadcasts for customer account associated with the given WFBS.

21. The system of claim 13, further comprising a backend processor coupled to the backend server, the backend processor is configured to:
receive the broadcast at the backend server from at least one master;
determine if a map private option is selected by the customer;

accept a selection of labels indicating specific networks where the message is to be dispatched, if the map private option is selected by the customer, and prioritize the order in which the message is to be delivered based upon the number of WFBS per IP Address before broadcasting message to the selected network; and broadcast message to each master in the descending order if the customer did not select the map private network option.

\* \* \* \* \*